United States Patent [19]

Myers

[11] 4,422,184
[45] Dec. 27, 1983

[54] INSECT PROTECTIVE GARMENT

[76] Inventor: Noreen Myers, 3345 Sandyshore, Metamora, Mich. 48455

[21] Appl. No.: 393,670

[22] Filed: Jun. 30, 1982

Related U.S. Application Data

[63] Continuation-in-part of Ser. No. 252,380, Apr. 9, 1981.

[51] Int. Cl.³ .......................... A42B 3/00; A41D 10/00
[52] U.S. Cl. .................................................... 2/4; 2/84
[58] Field of Search ........................ 2/4, 82, 80, 84, 79

[56] References Cited

U.S. PATENT DOCUMENTS

| | | | |
|---|---|---|---|
| 1,203,155 | 10/1916 | Strout | 2/4 |
| 1,580,453 | 4/1926 | Stentiford . | |
| 2,365,656 | 12/1944 | Lamsa | 2/4 |
| 2,543,317 | 2/1951 | Hammond | 2/82 |
| 2,869,132 | 1/1959 | Drummond | 2/4 |
| 3,100,897 | 8/1963 | Langer | 2/80 |
| 4,023,223 | 5/1977 | Anderson et al. | 9/330 |
| 4,038,698 | 8/1977 | Smith | 2/79 |
| 4,124,903 | 11/1978 | Shaw | 2/79 |

Primary Examiner—Doris L. Troutman
Attorney, Agent, or Firm—Basile, Weintraub & Hanlon

[57] ABSTRACT

An insect proof coverall garment is disclosed. The garment of the present invention is made from a lightweight insect excluding material covering the user's body and limbs with a releasable fastener extending from the user's hips to the neck to aid in putting the garment on and removing the garment. The garment includes a hood attached at the neck to cover the head of the user with an open face portion. The perimeter of the face opening is lined with a velcro material so that an insect or other small animal excluding mesh may be releasably attached thereto to protect the head and face of the user from insects or other small animals. The face mesh is readily removable for access to the user's mouth. Openings are formed at the shoulders, elbows and knees, and these openings are covered with an insect excluding mesh to provide ventilation along with maximum flexibility and comfort. In another embodiment, the garment is formed entirely of insect excluding mesh and covers the body, head and limbs of the wearer. The hood is formed with a front aperture and has a visor integrally mounted at an upper end thereof. A face covering member of insect excluding mesh is joined to the hood on certain of its edges and covers the front aperture in the hood. The body portion of the insect proof garment covers at least a portion of the wearer's body and is provided in two versions: one being a one-piece garment with pairs of arms and legs connected thereto and another in which an upper body portion extends from the neck to proximate the hips of the wearer and has arms connected thereto and a separate lower portion extending from the wearer's waist and having the legs connected thereto.

7 Claims, 6 Drawing Figures

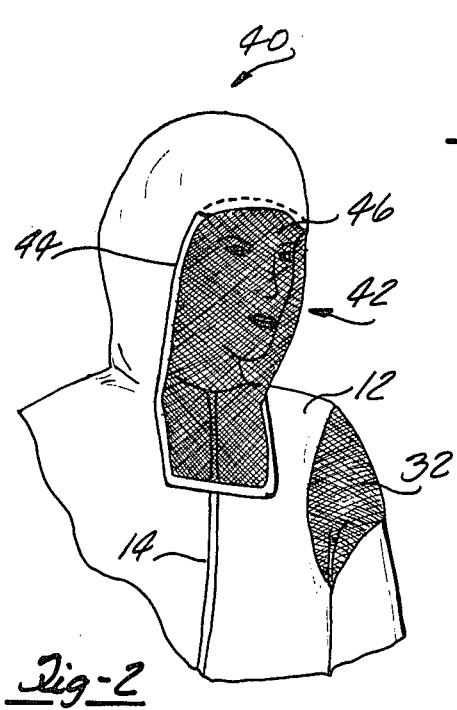
Fig-1
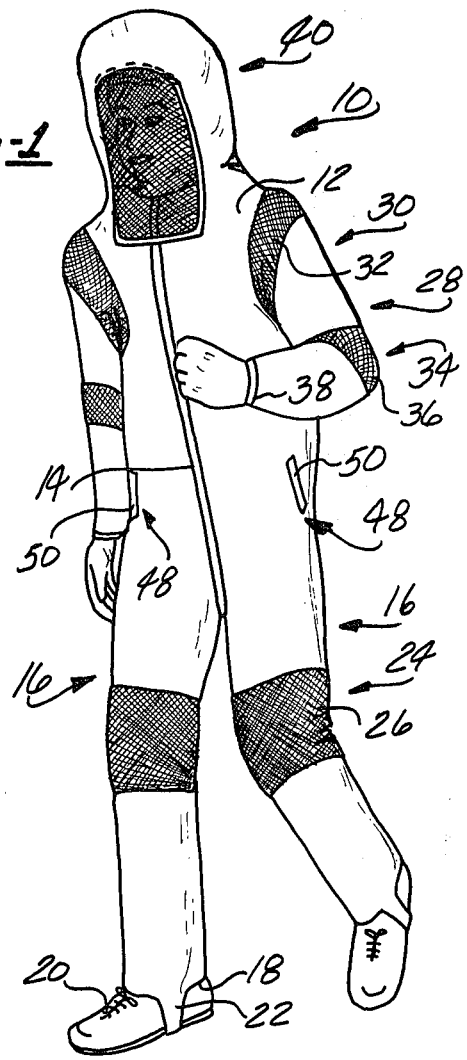
Fig-2
Fig-3
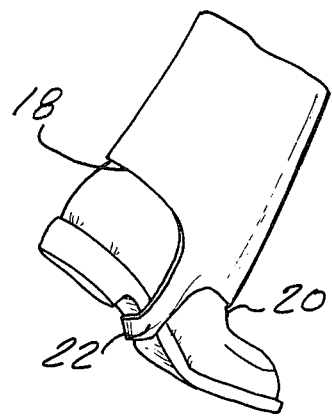
Fig-4

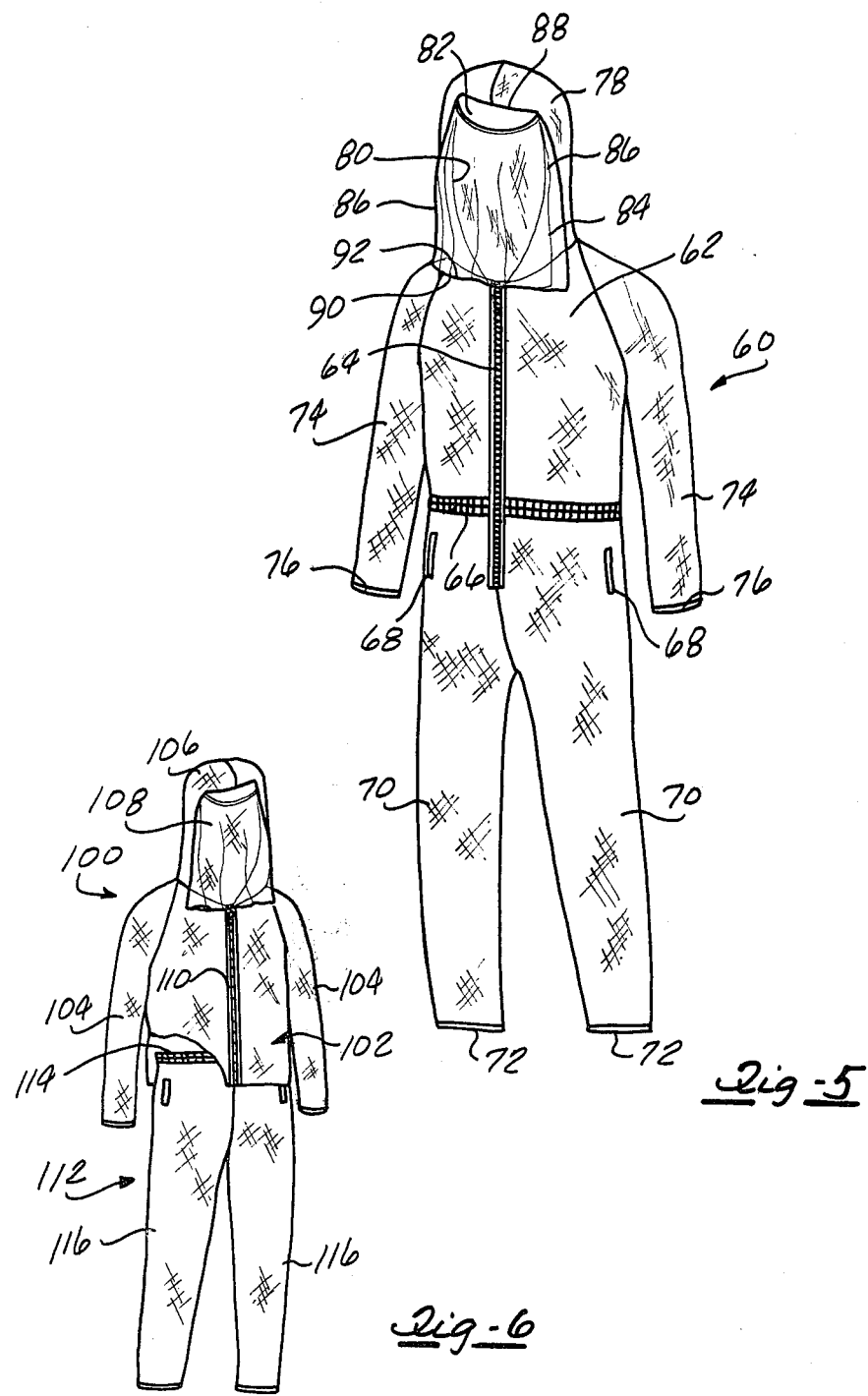

INSECT PROTECTIVE GARMENT

CROSS-REFERENCE TO CO-PENDING APPLICATION

This application is a continuation-in-part of co-pending application, Ser. No. 06/252,380, filed Apr. 9, 1981, in the name of Noreen Myers and entitled "INSECT PROTECTIVE GARMENT".

BACKGROUND OF THE INVENTION

I. Field of the Invention

The present invention generally relates to the field of protective clothing and, in particular, the present invention is concerned with protective clothing to protect the user from insects.

II. Description of the Prior Art

Protective clothing and protective garments are known in the prior art. The protective garments in the prior art are intended for protection of the wearer against the elements such as heat, cold and moisture, or to protect the head of the user from insects. Examples of protective garments in the prior art are disclosed in U.S. Pat. Nos. 1,203,155; 1,580,453; 2,365,656; 2,543,317; 2,869,132; 3,100,897; 4,023,223; 4,038,698 and 4,124,903. These patents are relevant to the Applicant's invention in that they represent the closest prior art disclosing protective garments and the like. None of the above-identified references disclose a coverall garment to protect the user from insects with portions of the garment removed and covered with an insect excluding mesh to provide ventilation and maximum flexibility at the elbows and joints of the garment. Further, none of the above-identified references disclose an insect protective garment formed entirely of insect excluding mesh which covers the wearer's limbs and head and at least a portion of his body.

SUMMARY OF THE INVENTION

The present invention, which will be described in greater detail hereinafter, comprises a lightweight insect and other small animal proof coverall garment sufficiently loose and large to pass over the normal outer garments of the wearer to completely enclose the body of the wearer and protect him from insects such as flies, mosquitoes and other small animals. The garment comprises a body portion of lightweight insect excluding material covering the user's body from his shoulders to his hips. A releasable fastener extending from the hips to the neck is provided for easy dawning or removal of the garment. A pair of legs of lightweight insect excluding material extend from the hips to the user's shoe tops, with a lower end of the legs abutting the shoe tops to exclude insects. A loop of elastic material is provided at a lower end of each leg extending around the arch of the user's shoe to hold the lower end of the leg in abutment with the shoe. An opening is formed at the knee of each leg with the opening covered with an insect excluding mesh to provide flexibility at the knee and ventilation for the comfort of the wearer.

The garment includes a pair of arms of lightweight insect excluding material that extends from the shoulders of the wearer to his wrists. A space is provided between the shoulder and the arm which space is covered with an insect excluding mesh for ventilation and flexibility. In a preferred embodiment, an elastic material is provided around the perimeter of the wrist to exclude insects. A space is provided at the elbow which is covered with an insect excluding mesh for ventilation and maximum flexibility.

A hood of lightweight insect excluding material is joined to the body portion at the neck and covers the user's head with an opening provided around the user's face. Velcro material is provided around the perimeter of the face opening to releasably attach an insect excluding face covering mesh to allow the user to see and provide ventilation around the face. The velcro material releasably attaches the face mesh to ready access to the user's mouth for smoking, eating, etc.

In another embodiment, the body, limbs and hood portions of the garment are formed entirely from insect excluding mesh for maximum ventilation. The hood includes a front aperture and an integral visor mounted at an upper end thereof. A face covering member formed of insect excluding mesh is secured to the hood on certain of its edges and covers the front aperture.

The body portion of the insect proof garment covers at least a portion of the wearer's body and is provided in two versions: one being a one-piece garment with pairs of arms and legs connected thereto and another in which an upper body portion extends from the neck to proximate the hips of the wearer and has the arms connected thereto and a separate lower portion extending from the wearer's waist and having the legs connected thereto.

It is therefore a primary object of the present invention to provide a one-piece protective garment to pass over the clothing of the user and protect the user from insects such as flies and mosquitoes.

It is a further object of the present invention to provide such a protective garment with a hood covering the head of the user.

It is yet another object of the present invention to provide a one-piece insect protective garment having a face mesh attached to the hood to provide ventilation and easy access to the user's mouth for eating or smoking.

Further objects, advantages, and applications of the present invention will become apparent to those skilled in the art of insect protective garments when the accompanying description of several examples contemplated for practicing the invention is read in conjunction with the accompanying drawing.

BRIEF DESCRIPTION OF THE DRAWING

In the drawing like numbers refer to like parts throughout the several views and wherein:

FIG. 1 illustrates a perspective view of one embodiment of the protective garment of the present invention;

FIG. 2 illustrates a broken perspective view of the upper portion of the garment of the present invention;

FIG. 3 illustrates the upper portion of the garment of FIG. 2 with the face mesh opened;

FIG. 4 illustrates a broken perspective view of the lower portion of the leg of the garment;

FIG. 5 illustrates a perspective view of another embodiment of the protective garment of the present invention; and FIG. 6 illustrates a perspective view of yet another embodiment of the protective garment of the present invention.

DESCRIPTION OF THE PREFERRED EMBODIMENTS

Referring now to the drawing, and in particular to FIG. 1 there is illustrated at 10 one example of the present invention in the form of an insect proof coverall garment. The coverall garment 10 comprises a body portion 12 of lightweight insect excluding material covering the user's body from the shoulders to the hips with a releasable fastener 14 extending from the hips to the neck to enable the user to easily get into or out of the garment. The garment 10 is deliberately made loose fitting to enable the user to comfortably wear the garment and to provide ample room for ventilation between the user's clothing and the garment in a manner which will be more fully described subsequently.

A pair of legs 16 of lightweight insect excluding material are attached to the body portion 12 and extend from the hips to the user's shoe tops. It is preferable that the lower end 18 of each leg 16 abut the user's shoe tops 20 to exclude insects from invading between the leg 16 and the leg of the user. Preferably a loop of elastic 22 attached to the lower end extends around the arch of the user's shoe to hold the lower end 18 in abutment with the shoe. A knee opening 24 is formed at the knee of each leg and is covered with an insect excluding mesh 26 to provide ventilation and ease of flexing the knees. A loose fit is preferred between the clothing of the user and the leg to provide a free flow of air into the knee opening 24 and upward around the body of the user for maximum comfort.

A pair of arms 28 of lighweight insect excluding material are provided and extend from the shoulders to the user's wrist, and a space 30 is provided between the shoulder and the arm which is enclosed with insect excluding mesh to provide ventilation around the user's shoulders and armpits as well as provide freedom of movement for the arms. An elbow space 34 is also provided at the elbow of each arm which is covered with an insect excluding mesh 36 for ventilation at the elbow as well as for freedrom of elbow motion. In a preferred embodiment, an elastic 38 is provided at the perimeter of the wrists to exclude insects from between the wrists and the arm of the user.

The insect proof coverall garment 10 further includes a hood 40 of lightweight insect excluding material joined to the body portion 12 at the neck. An opening 42 is provided for the face of the user, and the perimeter of the opening 42 is aligned with VELCRO material 44 so that an insect excluding face covering mesh 46 may be releasably attached to the face opening 42 and allow the user to selectively open the face covering mesh 46 for eating, drinking, or other activities requiring access to the user's mouth.

The insect excluding material from which the coverall garment 10 is constructed may be selected from a large variety of materials including cotton, nylon, dacron, or a combination thereof depending upon costs and availability. The garment is preferably made large and loose fitting so that free ventilation around the user's body and a comfortable fit over the user's clothing may be achieved. Normally it is preferable that the material forming the garment have the ability to breath and expel moisture for reasons of comfort. However, ample ventilation is provided by the various openings provided at the joints of the garment and more durable fabrics may be used. In certain working environments, for example, it may be preferable to make the garment from heavier, more durable material which would be permitted because of the ample ventilation provided by the various openings.

The releasable fastener 14 which is provided for easy getting into and removal of the garment, may be VELCRO fastener or may be a zipper type slide fastener of either plastic or metallic construction. The garment further includes a pair of slits 48 at pocket level for access to the user's inner garment and pockets. Flaps 50 are lined with velcro to releasably secure the slits closed and guard against the entry of insects or small animals.

Referring now to FIGS. 5 and 6, there is illustrated additional embodiments of an insect proof garment constructed in accordance with the teachings of the present invention which includes a body portion adapted to cover at least a portion of the wearer's body. The insect proof garment 60, shown in FIG. 5, includes a body portion 62 which covers a user's body from the shoulders to the hips. The body portion 62 is formed with a vertically extending aperture, not shown. Fastening means 64 are mounted on the sides of the aperture and are adapted for releasably closing the aperture. The fastening means 64 preferably extends from the waist of the user to the upper end or neck of the body portion 62 of the garment 60. Preferably, the fastening means 64 comprises a zipper or a VELCRO type fastener.

An elastic member 66 is secured to a lower portion of the body portion of the garment 60. Preferably, the elastic member 66 comprises an elastic band which functions to draw in the intermediate portion of the garment 60 about the waist of the user.

At least one and, preferably, a pair of slits 68 are formed at the lower end of the body portion 62 to enable access to the user's trouser pockets.

A pair of legs 70 are attached to the lower end of the body portion 62 and extend from the hips of the user to the user's shoe tops. Although the lower ends of the legs 70 may be loosely formed, it is preferred that an elastic member 72 be secured to the lower end of each of the legs 70 for drawing in the lower end of the legs 70 about the shoes of the user so as to exclude insects from invading the interior of the garment 60.

A pair of arm portions 74 are provided for the garment 60 and extend from the shoulders to the user's wrists. An elastic member 76 is secured to the ends of the arms 74 for drawing in the ends of the arms 74 tightly about the user's wrists.

The insect proof garment 60 further includes a hood 78 which is joined to the upper end of the body portion 62. The hood 78 is formed with a front aperture 80 which is adapted to be disposed in front of the user's face when the garment 60 is used. An arcuate shaped visor 82 is secured at an upper end of the aperture 80 in the hood 78 for shielding the eyes of the user. The visor 82 is formed of a rigid or semi-rigid material and extends outward from the hood 78.

A cover member 84 is joined to the hood 78 and covers the front aperture 80. The cover member 84 is adapted to be secured to the hood 78 at certain of its edges, such as side edges 86 and top edge 88. The bottom end 90 of the cover member is not connected to the hood 78 and is freely movable therefrom. Weight means 92 is mounted at the bottom end 90 of the cover member 84 and operates to urge the cover member 84 downward across the face of the user and towards the body portion 62 of the garment 60.

According to this embodiment of the present invention, the insect protection garment 60 is formed entirely of an insect excluding mesh material. Thus, the insect excluding mesh is used to form the body portion 62, the leg 70, arms 74, hood 78 and cover member 84. This allows maximum ventilation when the protective garment 60 is utilized.

The insect proof garment 100 shown in FIG. 6 is similar to that depicted in FIG. 5 in that the garment 100 includes a body portion 102 adapted to cover at least a portion of the wearer's body, and identical arms 104, hood 106 and cover member 108, all formed of an insect excluding mesh. The body portion 102 extends from the shoulders to proximate the hips of the wearer and has a vertical aperture formed therein which is closable by a releasable fastening means 110.

The insect proof garment 100 also includes a separate lower body portion 112 extending downward from an elastic waist band 114. A pair of leg members 116 are interconnected to the lower body portion 112.

It will be readily apparent that the separate body portions 102 and 112 of the insect proof garment 100 depicted in FIG. 6 can be used together to cover the entire body and limbs of the wearer or separately in conjunction with other types of wearing apparel.

It can thus be seen that the present invention has provided a new and improved insect proof coverall garment which may be readily dawned over the clothing of the user to protect the user from insects such as flies, mosquitoes and other small animals conveniently and without discomfort. The insect proof garment of the present invention is easy to use, very economical to produce and convenient to store in a compact, easily transported package.

It should be understood by those skilled in the art of insect proof garments that other forms of the applicant's invention may be had, all coming within the spirit of the invention and the scope of the appended claims.

Having thus described my invention, what I claim is:

1. An insect proof garment comprising:
   an interconnected pair of arms and body portion, each formed of an insect excluding mesh, the body portion adapted to cover at least a portion of the wearer's body;
   a hood formed of an insect excluding mesh joined to the body portion, the hood including:
   a front aperture;
   a visor joined to the hood at the upper end of the front aperture;
   a cover member made of an insect excluding mesh joined at certain of its edges to the hood and covering the front aperture in the hood; and
   weight means disposed along the bottom edge of the cover member for urging the cover member downward across the front aperture in the hood towards the body portion of the garment.

2. The insect proof garment of claim 1 wherein the body portion extends from the shoulders to the hips of the wearer and the insect proof garment further includes:
   a pair of legs interconnected with the body portion and formed of an insect excluding mesh.

3. The insect proof garment of claim 1 wherein the body portion includes:
   an upper portion extending from the shoulders to proximate the hips of the wearer, the pair of arms being connected with the upper portion of the body.

4. The insect proof garment of claim 3 wherein the body portion further includes:
   a separate portion extending from the waist of the wearer and having a pair of legs formed of an insect excluding mesh interconnected therewith.

5. The insect proof garment of claim 1 further including:
   an aperture formed in the body portion of the garment; and
   fastening means, mounted on the garment adjacent the sides of the aperture, for releasably closing the aperture.

6. The insect proof garment of claim 1 further including:
   elastic means secured to the ends of the arm portions of the garment for stretchably drawing inward the ends of the arm portions of the garment.

7. The insect proof garment of claim 1 further including:
   elastic means secured to the ends of the leg portions of the garment for stretchably drawing inward the ends of the leg portions of the garment.

* * * * *